(12) United States Patent
Liebinger Portela et al.

(10) Patent No.: US 11,084,488 B2
(45) Date of Patent: *Aug. 10, 2021

(54) VEHICLE COLLISION AVOIDANCE

(71) Applicant: INTERNATIONAL BUSINESS MACHINES CORPORATION, Armonk, NY (US)

(72) Inventors: Franz F. Liebinger Portela, Heredia (CR); Roxana Monge Nunez, San Jose (CR); Juan G. Rodriguez Arguedas, San Jose (CR); Edgar A. Zamora Duran, Santo Domingo (CR)

(73) Assignee: International Business Machines Corporation, Armonk, NY (US)

( * ) Notice: Subject to any disclaimer, the term of this patent is extended or adjusted under 35 U.S.C. 154(b) by 185 days.

This patent is subject to a terminal disclaimer.

(21) Appl. No.: 16/013,586

(22) Filed: Jun. 20, 2018

(65) Prior Publication Data
US 2018/0304888 A1    Oct. 25, 2018

Related U.S. Application Data

(63) Continuation of application No. 15/138,735, filed on Apr. 26, 2016, now Pat. No. 10,035,507.

(51) Int. Cl.
*B60W 30/095*    (2012.01)
*B60T 7/12*    (2006.01)
(Continued)

(52) U.S. Cl.
CPC ........... *B60W 30/0953* (2013.01); *B60T 7/12* (2013.01); *B60T 7/22* (2013.01); *B60W 30/08* (2013.01);
(Continued)

(58) Field of Classification Search
CPC ... B60T 7/22; G05D 1/00; G08G 1/16; B60Q 1/50
(Continued)

(56) References Cited

U.S. PATENT DOCUMENTS 6,278,360 B1 *  8/2001  Yanagi .................... B60Q 1/525
                                                340/436
6,359,552 B1 *  3/2002  King ....................... G08G 1/161
                                                180/167

(Continued)

FOREIGN PATENT DOCUMENTS

CN    102975700 A    3/2013
DE    102004062497 B4    5/2016
(Continued)

OTHER PUBLICATIONS

John Capp et al, "The Crash-Proof Car", [Online], [Retrieved on Feb. 7, 2016]. <URL: http://spectrum.ieee.org/transportation/safety/the-crashproof-car>, all pages.
(Continued)

*Primary Examiner* — Peter D Nolan
*Assistant Examiner* — Wae L Louie
(74) *Attorney, Agent, or Firm* — Nathan M. Rau

(57) ABSTRACT

Method of collision avoidance which includes: sensing parameters by a first vehicle with respect to relative movements of the first vehicle and a second vehicle; responsive to determining by the first vehicle, based on the sensed parameters, of an impending collision with the second vehicle, communicating, by the first vehicle, a query to the second vehicle as to if the second vehicle can perform a corrective action to avoid a collision with the first vehicle; and performing, by the first vehicle and independent of any corrective action performed by the second vehicle, a corrective action to avoid a collision with the second vehicle.

20 Claims, 4 Drawing Sheets

(51) Int. Cl.
  *B60T 7/22* (2006.01)
  *B60W 30/08* (2012.01)
  *B60W 30/18* (2012.01)
  *G08G 1/16* (2006.01)

(52) U.S. Cl.
  CPC ....... *B60W 30/18109* (2013.01); *G08G 1/162* (2013.01); *G08G 1/166* (2013.01); *B60T 2201/022* (2013.01); *B60W 2554/804* (2020.02); *B60W 2556/65* (2020.02)

(58) Field of Classification Search
  USPC .................................... 701/24; 340/435, 436
  See application file for complete search history.

(56) References Cited

U.S. PATENT DOCUMENTS

| | | | | |
|---|---|---|---|---|
| 6,831,572 | B2* | 12/2004 | Strumolo | B60Q 1/525 180/167 |
| 9,711,050 | B2* | 7/2017 | Ansari | G06Q 40/08 |
| 2010/0256852 | A1* | 10/2010 | Mudalige | G08G 1/22 701/24 |
| 2015/0170519 | A1 | 6/2015 | Langgood | |
| 2015/0210256 | A1* | 7/2015 | Yamashita | B60T 13/147 303/14 |
| 2016/0358477 | A1* | 12/2016 | Ansari | G06Q 30/0251 |
| 2017/0146563 | A1* | 5/2017 | Braunberger | G08G 1/166 |
| 2017/0166215 | A1* | 6/2017 | Rander | B60T 8/1725 |
| 2017/0168503 | A1* | 6/2017 | Amla | G05D 1/0011 |
| 2017/0206789 | A1* | 7/2017 | Shimizu | G05D 1/0257 |
| 2017/0287335 | A1* | 10/2017 | Ansari | B60W 40/04 |

FOREIGN PATENT DOCUMENTS

| | | |
|---|---|---|
| JP | 2004155241 A | 6/2004 |
| WO | 2012081915 A1 | 6/2012 |
| WO | 2014054937 A1 | 4/2014 |

OTHER PUBLICATIONS

List of IBM Patents or Patent Applications Treated as Related.

Xinshuai Che et al., "Prewarning System for Preventing Rear-Ends Collisions on Freeways", [online]. Retrieved from the Internet. URL:http://ieeexplore.ieee.org/xpl/articleDetails.jsp?arnumber=5497535&newsearch=true&queryText=AVOID%20CRASH%20SEND%20ALARM%20TO%20NEARBY%20VEHICLES>, 2010, all pages.

Xue Yang et al., "A vehicle-to-vehicle communication protocol for cooperative collision warning", [online], [ retrieved on Feb. 10, 2016]. Retrieved from the Internet. <URL: https://www.google.com/url?paf=&q=http://citeseerx.ist.psu.edu/viewdoc/download%3Fdoi%3D10.1.1.83.3428%26rep%3Drep1%26type%3Dpdf&usg=AFQjCNH-5GDWvphxX-eWoMycDPucftiliA>, all pages.

* cited by examiner

VEHICLE COLLISION AVOIDANCE

BACKGROUND

The present exemplary embodiments pertain to collision avoidance between multiple vehicles and, more particularly, pertain to a method and apparatus for communicating between a first vehicle and a second vehicle that may cause the second vehicle to take a corrective action to avoid the first vehicle colliding with it.

Collision warning systems are becoming more widely used. Collision warning systems provide a vehicle operator knowledge and awareness of objects or vehicles within a close proximity so as to prevent colliding with those objects. A sensor located on a vehicle, upon sensing an object, generates an object detection signal, which is communicated to the operator of the vehicle.

Typically, a collision that occurs between two moving vehicles occurs over a short duration of time. It is common to see collisions on city streets that may be overpopulated with vehicles. Some of the operators of these vehicles may be distracted for one reason or another that may lead to insufficient time for an operator to react to an impending collision with another vehicle.

BRIEF SUMMARY

The various advantages and purposes of the exemplary embodiments as described above and hereafter are achieved by providing, according to one aspect of the exemplary embodiments, a method of collision avoidance comprising: sensing parameters by a first vehicle with respect to relative movements of the first vehicle and a second vehicle; responsive to determining by the first vehicle, based on the sensed parameters, of an impending collision with the second vehicle, communicating, by the first vehicle, a query to the second vehicle as to if the second vehicle can perform a corrective action to avoid a collision with the first vehicle; and performing, by the first vehicle and independent of any corrective action performed by the second vehicle, a corrective action to avoid a collision with the second vehicle.

According to another aspect of the exemplary embodiments, there is provided an apparatus in a first vehicle for collision avoidance with respect to a second vehicle, comprising: an apparatus in a first vehicle for collision avoidance with respect to a second vehicle, comprising: a central processing unit; a plurality of sensors for sensing parameters with respect to relative movements of the first vehicle and the second vehicle; and a transceiver to communicate with the second vehicle; wherein, in operation, responsive to an imminent need sensed to avoid a collision with the second vehicle, the transceiver interactively communicates with the second vehicle and queries whether the second vehicle can perform a corrective action to avoid a collision with the first vehicle, the first vehicle, independent of any corrective action performed by the second vehicle, performs a corrective action to avoid a collision with the second vehicle.

According to a further aspect of the exemplary embodiments, there is provided a computer program product for collision avoidance comprising a computer readable storage medium having program instructions embodied therewith, the program instructions readable by a processor to cause the processor to perform a method comprising: computer program product for collision avoidance comprising a computer readable storage medium having program instructions embodied therewith, the program instructions readable by a processor to cause the processor to perform a method comprising: sensing parameters by a first vehicle with respect to relative movements of the first vehicle and a second vehicle; responsive to determining by the first vehicle, based on the sensed parameters, of an impending collision with the second vehicle, communicating, by the first vehicle, a query to the second vehicle as to if the second vehicle can perform a corrective action to avoid a collision with the first vehicle; and performing, by the first vehicle and independent of any corrective action performed by the second vehicle, a corrective action to avoid a collision with the second vehicle.

BRIEF DESCRIPTION OF SEVERAL VIEWS OF THE DRAWINGS

The features of the exemplary embodiments believed to be novel and the elements characteristic of the exemplary embodiments are set forth with particularity in the appended claims. The Figures are for illustration purposes only and are not drawn to scale. The exemplary embodiments, both as to organization and method of operation, may best be understood by reference to the detailed description which follows taken in conjunction with the accompanying drawings in which:

DETAILED DESCRIPTION

A general trend in recent years is to give computer assistance to users of different systems. The idea of these systems is to improve the performance of the users while eliminating the complexity in operating the systems. Vehicle manufacturers, for example automobile manufacturers, are one of the big players in this area and one of their main interests is to avoid collisions with other vehicles and other objects. For example, vehicles these days may be equipped with rearward-facing cameras that activate while reversing, or they may have several sensors to determine proximity to other objects.

The collision warning systems currently in use may warn the operator of the vehicle of an impending collision with another vehicle but cannot otherwise take a corrective action with respect to the another vehicle to avoid the collision. In some cases, these collisions may be avoided if one or more vehicles move just a little bit from their original positions to allow a braking response from either the operator of the vehicle or an autonomous response from the vehicle.

The exemplary embodiments may provide computer assistance for collision avoidance by providing a method and an apparatus to automatically coordinate two or more vehicles' actions and execute those vehicles' actions to improve avoidance of vehicle collisions.

Figure 1:
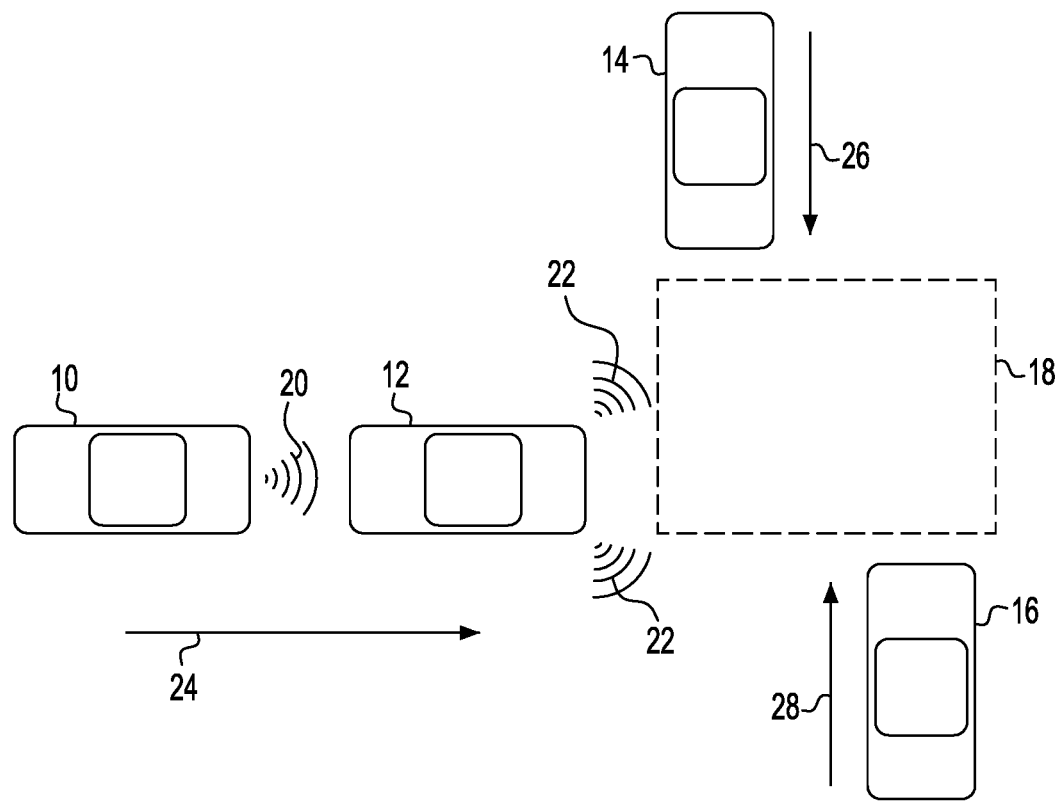
FIG. 1 is an illustration of one traffic pattern for which the exemplary embodiments may be used.
Figure 2:
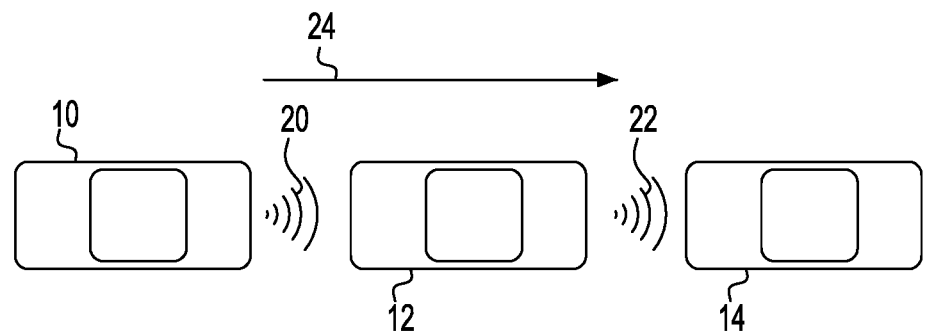
FIG. 2 is an illustration of another traffic pattern for which the exemplary embodiments may be used.

Referring to the Figures in more detail, FIGS. 1 and 2 illustrate two traffic patterns for which the exemplary embodiments may be used. It should be understood that these traffic patterns are only for the purpose of illustration and not limitation and other traffic patterns may find use for the exemplary embodiments.

FIG. 1 illustrates a first traffic pattern of a first vehicle 10 following a second vehicle 12. Second vehicle 12 may stop suddenly requiring the first vehicle 10 to also stop suddenly. However, because the operator of the first vehicle 10 may have been distracted or perhaps was following the second vehicle 12 too closely, there may be a collision between the first vehicle 10 and the second vehicle 12. It may be possible though for the second vehicle 12 to move slightly into the intersection 18 to increase the braking distance available to the first vehicle 10. In order for the second vehicle 12 to move safely into the intersection 18, the second vehicle 12 may have to account for a third vehicle 14, and may be even a fourth vehicle 16, that may be approaching or in the intersection 18.

FIG. 2 illustrates a second traffic pattern of a first vehicle 10 following a second vehicle 12. Second vehicle 12 may stop suddenly requiring the first vehicle 10 to also stop suddenly. However, because the operator of the first vehicle 10 may have been distracted or perhaps was following the second vehicle 12 too closely, there may be a collision between the first vehicle 10 and the second vehicle 12. It may be possible though for the second vehicle 12 to move slightly forward to increase the braking distance available to the first vehicle 10. In order for the second vehicle 12 to move forward, the second vehicle 12 may have to account for a third vehicle 14 in front of the second vehicle 12.

The vehicles illustrated in FIGS. 1 and 2 may be any vehicle including but not limited to an automobile, truck or motorcycle.

Figure 3:
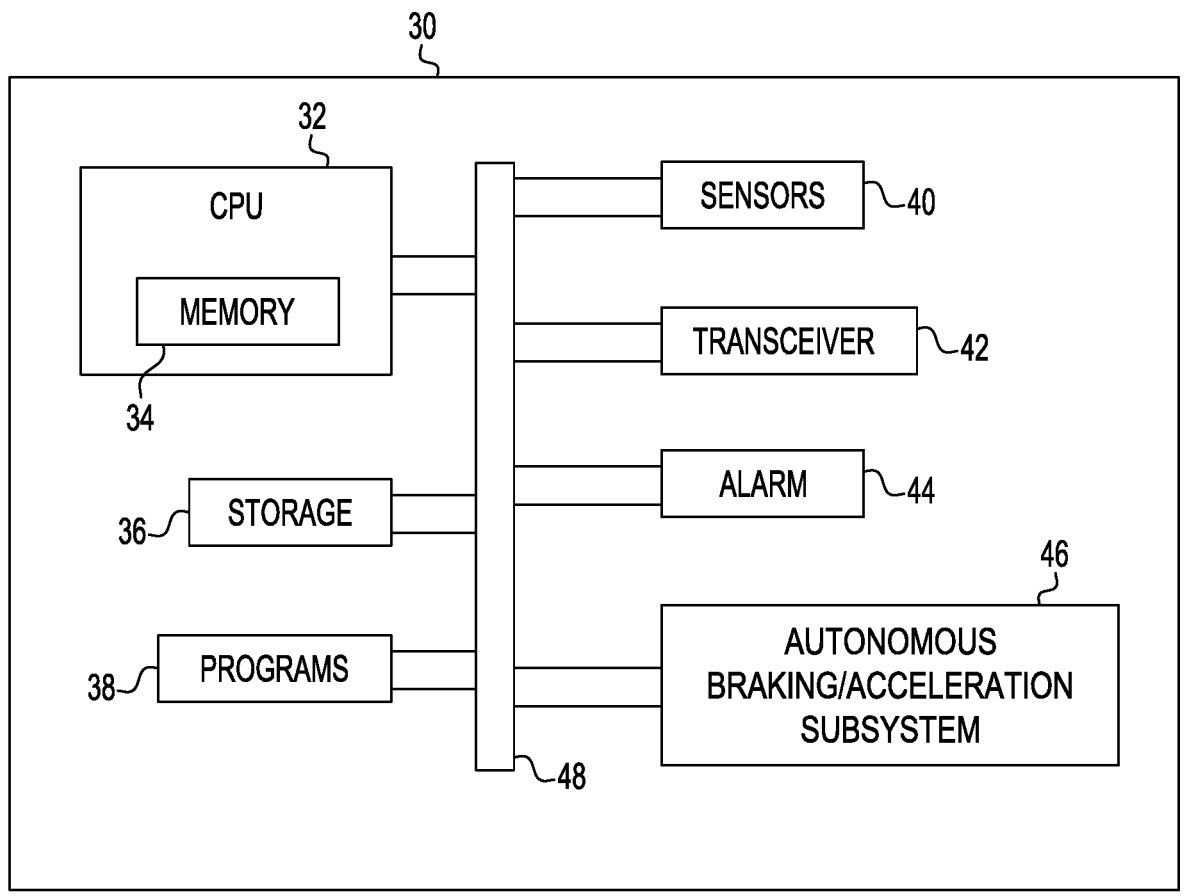
FIG. 3 is an illustration of an exemplary embodiment of an apparatus for collision avoidance.

Referring now to FIG. 3, there is illustrated an exemplary embodiment of an apparatus 30 for avoiding collisions such as those that might occur as depicted in FIGS. 1 and 2. The apparatus 30 may be present in the first vehicle 10 and second vehicle 12 shown in FIGS. 1 and 2. It is also within the scope of the exemplary embodiments for the third vehicle 14 and fourth vehicle 16 to also have the apparatus 30. It is further within the scope of the exemplary embodiments for vehicles not shown in FIGS. 1 and 2 to also have the apparatus 30.

The apparatus 30 may include a central processing unit 32 having memory 34. Storage 36 such as a flash drive or hard drive may also be present in apparatus 30 although it is within the scope of the exemplary embodiments to have the storage 36 remote from the apparatus 30 and connected by a network of some sort to the apparatus 30. The apparatus 30 may further include programs 38 having executable code for implementing the methods of the exemplary embodiments.

Also included within apparatus 30 may be various sensors 40 that may sense or determine various parameters with respect to the vehicle, such as first vehicle 10, having the apparatus 30 including but not limited to the direction of movement of the vehicle, the speed of the vehicle and the acceleration of the vehicle. The sensors 40 may also sense or determine various parameters with respect to an adjacent vehicle, such as the second vehicle 12, such as the direction of movement of the adjacent vehicle, the speed of the adjacent vehicle and the acceleration of the adjacent vehicle. The sensors 40 may also sense or determine a distance between the vehicle and the adjacent vehicle. The distance between two adjacent vehicles is referred to hereafter as the "spaced distance".

Transceiver 42 may be present in the apparatus 30 in the vehicle to interactively communicate with an adjacent vehicle. The transceiver 42 may use any wireless communication technology including but not limited to radio, Bluetooth short range radio and WiFi.

Apparatus 30 may further include an alarm 44 for indicating to the operator of the vehicle that a collision with another vehicle or object is imminent and the operator of the vehicle should take a corrective action such as immediately applying the brakes or swerving off the road in a safe manner to avoid the collision.

Lastly, the apparatus 30 may include an autonomous braking and acceleration subsystem 46. According to the exemplary embodiments, the autonomous braking and acceleration subsystem 46 may automatically apply braking to stop the vehicle or accelerate the vehicle as the situation may dictate, as explained hereafter. The autonomous braking and acceleration subsystem 46 is in addition to the manually-applied braking and acceleration systems that are present in a normal vehicle.

All the components in the apparatus 30 may be connected by a bus 48.

Figure 4:
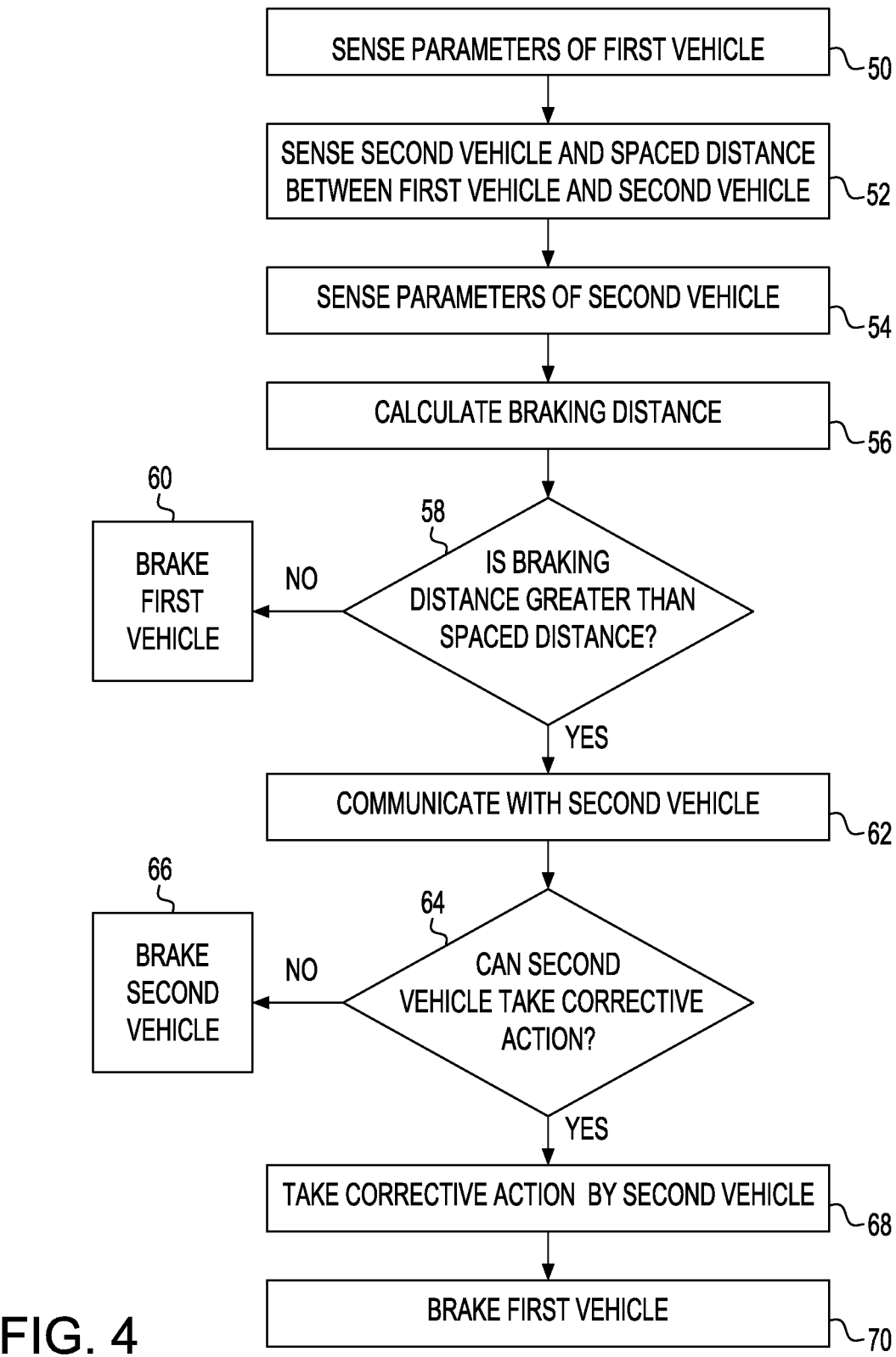
FIG. 4 is a flow chart of an exemplary embodiment of a method for collision avoidance.

Referring now to FIG. 4, there is illustrated an exemplary embodiment of a method for collision avoidance. In the description of FIG. 4, reference may also be made to the foregoing FIGS. 1 to 3.

In a first step 50, parameters of a first vehicle 10 may be sensed by the sensors 40 in the first vehicle 10. Parameters, including but not limited to, the direction of movement, speed and acceleration of the first vehicle 10 may be sensed by the sensors 40.

In a second step 52, the presence of a second vehicle 12 and the spaced distance between the first vehicle 10 and the second vehicle 12 may be sensed by the sensors 40 in the first vehicle 10.

In a third step 54, parameters of a second vehicle 12 may be sensed by the sensors 40 in the first vehicle 10. Parameters, including but not limited to, the direction of movement, speed and acceleration of the second vehicle 12 may be sensed by the sensors 40 in the first vehicle 10.

The apparatus 30 such as by CPU 32 may then calculate, given the direction, speed and acceleration of the first vehicle 10 and the second vehicle 12, the distance that the first vehicle 10 needs to safely stop the first vehicle 10 to avoid a collision with the second vehicle 12, step 56. This distance may be referred to hereafter as the "braking distance".

Then, the apparatus 30 such as by CPU 32 may query whether the braking distance is greater than the spaced distance, step 58. That is, will the first vehicle 10 have sufficient roadway to be able to safely stop before first vehicle 10 collides with the second vehicle 12?

In one exemplary embodiment, the foregoing steps 50 to 58 may be continually occurring as the first vehicle 10 moves through various traffic patterns and encounters various vehicles. In another exemplary embodiment, the foregoing steps 50 to 58 may only be occurring when the apparatus 30 senses through sensors 40 that vehicle 12 has suddenly stopped or that there is an imminent collision that is possible.

It should be understood that the exemplary embodiments are applicable to the vehicles moving in a forward direction or in a backward direction. In the latter situation, the first vehicle 10 may be backing up and the sensors 40 may sense that the first vehicle 10 is about to collide with a second vehicle 12 in back of the first vehicle 10. In another situation, the first vehicle 10 may be stopped on a hill and the operator of the first vehicle 10 momentarily loses concentration and releases some pressure from the brake pedal causing the first vehicle 10 to drift back towards the second vehicle 12.

Referring back to step 58, if the braking distance is not greater than the spaced distance, meaning the operator has time to stop the first vehicle 10 before a collision occurs, the method follows the "NO" path and the first vehicle 10 may be stopped by the operator of the first vehicle, or the autonomous braking and acceleration subsystem 46, applying the brakes of the first vehicle 10, step 60.

On the other hand, if the braking distance is greater than the spaced distance, meaning the operator will be unable to stop the first vehicle 10 before a collision occurs, the method follows the "YES" path. The first vehicle 10 may communicate with the second vehicle 12 through transceiver 42 in apparatus 30, step 62. The second vehicle 12 will have a similar apparatus 30 and transceiver 42 to communicate with the first vehicle 10.

The first vehicle 10 through apparatus 30 may query the second vehicle 12 and ask if the second vehicle 12 can take a corrective action to avoid a collision with the first vehicle 10, step 64. If the second vehicle 12 cannot take the corrective action, the method follows the "NO" path and the second vehicle may apply the brakes in the second vehicle 12 to avoid colliding with yet a third vehicle. If the second vehicle 12 is able to take the corrective action, the method follows the "YES" path. The process referenced in step 64 as to whether the second vehicle 12 can take the corrective action will be described in more detail hereafter.

The second vehicle 12, following the "YES" path may then take the corrective action, step 68. The first vehicle 10 may also take a corrective action by braking, step 70.

The corrective action that the second vehicle 12 may take may be simply accelerating in its direction of travel a distance sufficient to avoid a collision with the first vehicle 10. This distance may be only a small distance such as a foot or several feet or may be a larger distance sufficient to avoid a collision with the first vehicle 10. The first vehicle 10 may even suggest, by communicating through transceiver 42 with the second vehicle 12, the distance that the second vehicle 12 needs to move to avoid the collision. In essence, the corrective action increases the spaced distance enough such that it is greater than the braking distance, thereby giving the first vehicle 10 time and distance to apply the brakes and avoid a collision with the second vehicle 12.

The braking and acceleration that the first vehicle 10 and second vehicle 12 may employ to avoid a collision may be manually applied by the respective operators of the vehicles. However, due to the extremely short reaction times involved, it is more likely that the autonomous braking and acceleration subsystem 46 in the apparatus 30 in each of the first vehicle 10 and second vehicle 12 will perform the necessary braking and acceleration.

Figure 5:
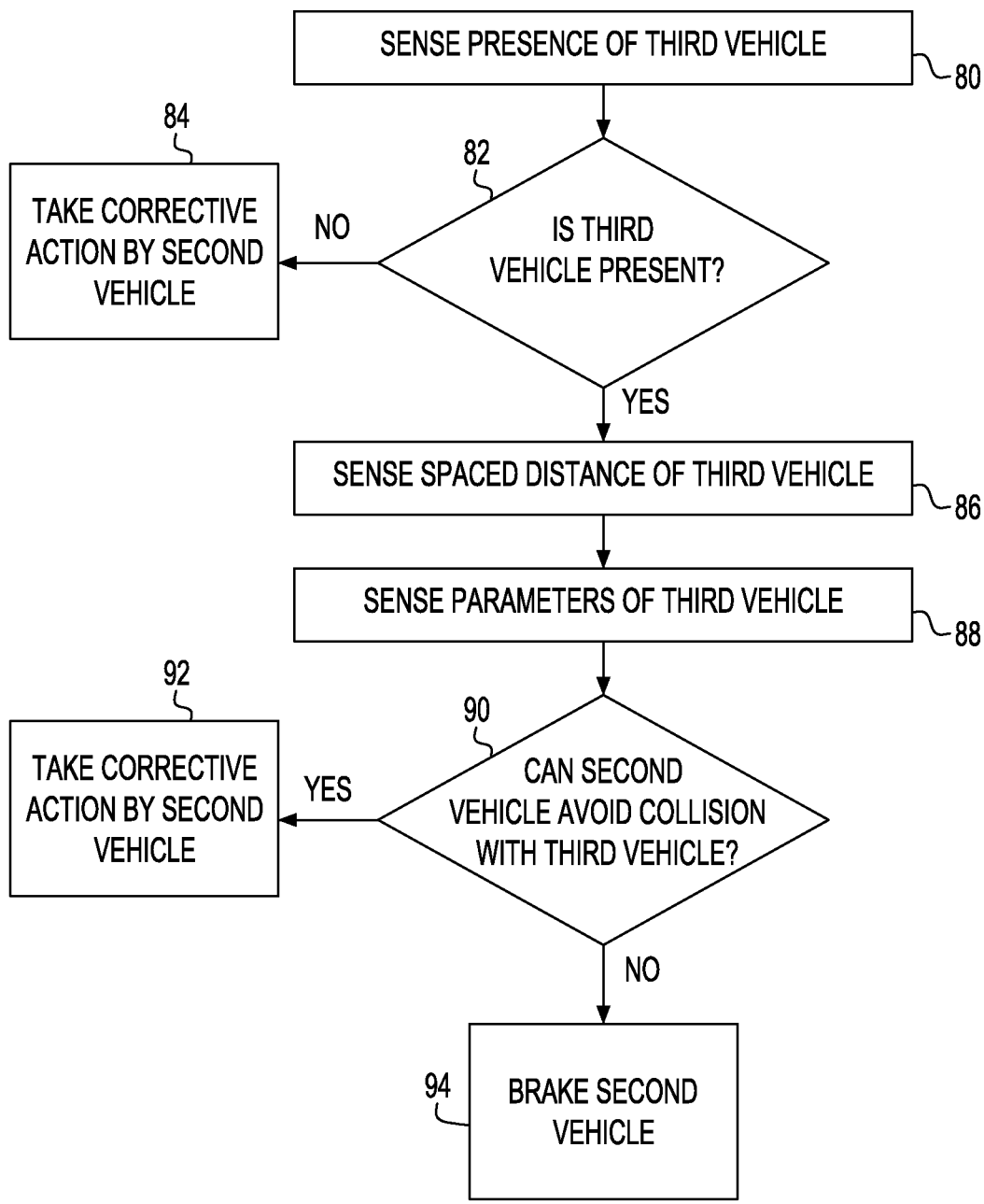
FIG. 5 is a flow chart of one aspect of the method for collision avoidance of FIG. 4.

As noted above in regards to step 64, apparatus 30 may query the second vehicle 12 and ask if the second vehicle 12 can take a corrective action to avoid a collision with the first vehicle 10. This query may result in a process as described in more detail in FIG. 5. Referring now to FIG. 5, the second vehicle 12 may sense for the presence of a third vehicle, step 80, such as third vehicle 14 in FIGS. 1 and 2. The query is made in step 82 as to whether the third vehicle 14 may be present. If the third vehicle is not present, the "NO" path is followed and the second vehicle 12 may take corrective action, step 84. If the third vehicle 14 is present, the "YES" path is followed. There may be more than the third vehicle 14 present. That is, the fourth vehicle 16 may also be present.

If the third vehicle 14 is present, then the sensors 40 in the apparatus 30 in the second vehicle 12 may sense the spaced distance between the second vehicle 12 and the third vehicle 14, step 86.

The sensors 40 in the apparatus 30 in the second vehicle 12 may also sense the parameters of the third vehicle 14, step 88. These parameters may include, but not be limited to, the direction of the third vehicle 14, the speed of the third vehicle 14 and the acceleration of the third vehicle 14. Similar sensing may also be done if there is a fourth vehicle 16 present.

The apparatus 30, such as CPU 32, in the second vehicle 12 may then query whether the second vehicle 12 may avoid a collision with the third vehicle 14 (and the fourth vehicle 16 if present) if the second vehicle 12 takes the corrective action, step 90. As the apparatus 30 of the second vehicle 12 knows the direction, speed and acceleration of the second vehicle 12 and the third vehicle 14 (and the fourth vehicle 16 if present), as well as the spaced distance between the second vehicle 12 and the third vehicle 14 (and the fourth vehicle 16 if present), the apparatus 30 of the second vehicle 12 may make a determination as to whether the second vehicle 12 may take the corrective action. This determination by the apparatus 30 of the second vehicle 12 may be a mathematical calculation or an estimation giving the time before the third vehicle 14 passes (and the fourth vehicle 16 if present) into the second vehicle's 12 path.

If the determination in step 90 is that the second vehicle 12 may take corrective action, then the process proceeds down the "YES" path and the second vehicle 12 takes the corrective action to avoid a collision with the first vehicle 10, step 92. Alternatively, if the determination in step 90 is that the second vehicle 12 may not take corrective action, then the process proceeds down the "NO" path and the second vehicle 12 does not take the corrective action and instead may manually or autonomously apply the brakes, step 94, and avoids a collision with the third vehicle 14 but may not avoid a collision with the first vehicle 10.

Referring back to FIGS. 1 and 2, it is depicted in these Figures that the first vehicle 10 senses 20 through sensors 40 of apparatus 30 the presence and parameters of the second vehicle 12. First vehicle 10 and second vehicle 12 are moving in the same direction 24. It would be desirable for the second vehicle 12 to move ahead in the same direction 24 to increase the spaced distance between the first vehicle 10 and the second vehicle 12 to avoid a collision with the first vehicle 10.

Before the second vehicle 12 may move ahead in the direction of travel 24, there must be room for the second vehicle to do so. Thus, the second vehicle 12 senses 22 through sensors 40 of apparatus 30 in the second vehicle 12 the presence and parameters of the third vehicle 14 and perhaps also a fourth vehicle 16.

With particular reference to FIG. 1, the second vehicle 12 cannot accelerate into the intersection 18 if the third vehicle 14 traveling in direction 26 and/or the fourth vehicle 16 traveling in the direction 28 are likely to be there as well. Directions 26 and 28 may be at an angle to direction 24 and in a typical intersection, directions 26 and 28 may be perpendicular to direction 24. If the third vehicle 14 and/or the fourth vehicle are likely to be in the intersection 18 when the second vehicle 12 needs to be there, then the second vehicle 12 may manually or autonomously apply the brakes of the second vehicle 12 to avoid a multiple collision with the third vehicle 14 and/or the fourth vehicle 16. If the third vehicle 14 and the fourth vehicle 16 will not be in the intersection 18 when the second vehicle 12 needs to be there, then the second vehicle 12 may manually or autonomously accelerate into the intersection 18 and avoid a collision with the first vehicle 10 while also avoiding a collision with the third vehicle 14 and fourth vehicle 16.

With particular reference to FIG. 2, the second vehicle 12 may not accelerate in the direction of travel 24 if the acceleration would cause the spaced distance between the second vehicle 12 and the third vehicle 14 to decrease to such an extent that the second vehicle 12 collides with the third vehicle 14. If the spaced distance between the second vehicle 12 and the third vehicle 14 is sufficiently large, then the second vehicle 12 may accelerate in the direction of travel 24 to avoid a collision with the first vehicle 10 while also avoiding a collision with the third vehicle 14.

It is also within the scope of the exemplary embodiments for the third vehicle 12 to instead be an object, such as a fallen tree, or a person. The same process as previously described may apply equally here as well. The second vehicle 12 would not accelerate forward or backward if the object or person was close to and in the path of the second vehicle 12.

It should be understood that the exemplary embodiments are iterative in principle. That is, while the exemplary embodiments have been described by which a first vehicle and a second vehicle may avoid a collision between the first vehicle and the second vehicle, the exemplary embodiments may also pertain to the second vehicle and a third vehicle which may avoid a collision between the second vehicle and the third vehicle. Further iteratively, the exemplary embodiments may pertain further to the third vehicle and a fourth vehicle and so on which vehicles may avoid a collision between the two vehicles according to the exemplary embodiments.

Thus, in one exemplary embodiment, to avoid a collision between a first vehicle and a second vehicle, the first vehicle may communicate with the second vehicle to take a corrective action to avoid a collision between the first vehicle and the second vehicle. If the second vehicle determines that it may not take the corrective action because of the presence of a third vehicle, the second vehicle may communicate with the third vehicle to take a corrective action to avoid a collision between the second vehicle and the third vehicle. Similarly, if the third vehicle determines that it may not take the corrective action because of the presence of a fourth vehicle, the third vehicle may communicate with the fourth vehicle to take a corrective action to avoid a collision between the third vehicle and the fourth vehicle. This iterative process may continue up the line of vehicles so as to avoid a multiple collision situation.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent to those skilled in the art having regard to this disclosure that other modifications of the exemplary embodiments beyond those embodiments specifically described here may be made without departing from the spirit of the invention. Accordingly, such modifications are considered within the scope of the invention as limited solely by the appended claims.

What is claimed is:

1. A method of collision avoidance comprising:
    sensing parameters by a first vehicle with respect to relative movements of the first vehicle and a second vehicle;
    responsive to determining by the first vehicle, based on the sensed parameters, of an impending collision with the second vehicle, communicating, by the first vehicle, a query to the second vehicle as to if the second vehicle can perform a corrective action to avoid a collision with the first vehicle; and
    performing, by the first vehicle and independent of any corrective action performed by the second vehicle, a corrective action to avoid a collision with the second vehicle.

2. The method of claim 1 wherein autonomously braking the first vehicle is the corrective action performed by the first vehicle.

3. The method of claim 1 wherein the parameters are direction of movement of the first and second vehicles, speed of the first and second vehicles and acceleration of the first and second vehicles.

4. The method of claim 1 wherein subsequent to the communicating, by the first vehicle, the query to the second vehicle, performing the corrective action by the second vehicle.

5. The method of claim 4 wherein the relative movements of the first vehicle and the second vehicle are in a first direction and wherein the corrective action by the second vehicle is autonomously accelerating in the first direction a distance to avoid a collision with the first vehicle.

6. The method of claim 1 wherein the first direction is forward.

7. The method of claim 1 wherein the first direction is backward.

8. The method of claim 1 further comprising:
    sensing by the second vehicle a presence of a third vehicle;
    sensing parameters by the second vehicle with respect to a movement of the third vehicle when the third vehicle is present;
    performing the corrective action by the second vehicle when the second vehicle can avoid a collision with the third vehicle or when the third vehicle is not present and braking by the second vehicle when the second vehicle cannot perform the corrective action.

9. The method of claim 8 wherein the relative movements of the first vehicle and the second vehicle are in a first direction and wherein the corrective action by the second vehicle is autonomously accelerating in the first direction a distance to avoid a collision with the first vehicle.

10. An apparatus in a first vehicle for collision avoidance with respect to a second vehicle, comprising:
    a central processing unit;
    a plurality of sensors for sensing parameters with respect to relative movements of the first vehicle and the second vehicle; and
    a transceiver to communicate with the second vehicle;
    wherein, in operation,
    responsive to an imminent need sensed to avoid a collision with the second vehicle, the transceiver interactively communicates with the second vehicle and queries whether the second vehicle can perform a corrective action to avoid a collision with the first vehicle, the first vehicle, independent of any corrective action performed by the second vehicle, performs a corrective action to avoid a collision with the second vehicle.

11. The apparatus of claim 10 further comprising an autonomous braking and acceleration system wherein the corrective action performed by the first vehicle is the first vehicle is autonomously braked to avoid a collision with the second vehicle.

12. A computer program product for collision avoidance comprising a non-transitory computer readable storage medium having program instructions embodied therewith, the program instructions readable by a processor to cause the processor to perform a method comprising:
    sensing parameters by a first vehicle with respect to relative movements of the first vehicle and a second vehicle;

responsive to determining by the first vehicle, based on the sensed parameters, of an impending collision with the second vehicle, communicating, by the first vehicle, a query to the second vehicle as to if the second vehicle can perform a corrective action to avoid a collision with the first vehicle; and performing, by the first vehicle and independent of any corrective action performed by the second vehicle, a corrective action to avoid a collision with the second vehicle.

13. The computer program product of claim 12 wherein autonomously braking the first vehicle is the corrective action performed by the first vehicle.

14. The computer program product of claim 12 wherein the parameters are direction of movement of the first and second vehicles, speed of the first and second vehicles and acceleration of the first and second vehicles.

15. The computer program product of claim 12 wherein subsequent to the communicating, by the first vehicle, the query to the second vehicle, performing the corrective action by the second vehicle.

16. The computer program product of claim 15 wherein the relative movements of the first vehicle and the second vehicle are in a first direction and wherein the corrective action by the second vehicle is autonomously accelerating in the first direction a distance to avoid a collision with the first vehicle.

17. The computer program product of claim 12 wherein the first direction is forward.

18. The computer program product of claim 12 wherein the first direction is backward.

19. The computer program product of claim 12 further comprising:

sensing by the second vehicle a presence of a third vehicle;

sensing parameters by the second vehicle with respect to a movement of the third vehicle when the third vehicle is present;

performing the corrective action by the second vehicle when the second vehicle can avoid a collision with the third vehicle or when the third vehicle is not present and braking by the second vehicle when the second vehicle cannot perform the corrective action.

20. The computer program product of claim 19 wherein the relative movements of the first vehicle and the second vehicle are in a first direction and wherein the corrective action by the second vehicle is autonomously accelerating in the first direction a distance to avoid a collision with the first vehicle.

* * * * *